(12) United States Patent
Dill et al.

(10) Patent No.: US 7,264,566 B2
(45) Date of Patent: Sep. 4, 2007

(54) GEARED FITTING FOR A VEHICLE SEAT

(75) Inventors: Thomas Dill, Heiligenmoschel (DE); Erdal Kuscu, Landau (DE)

(73) Assignee: Keiper GmbH & Co. KG, Kaiserslautern (DE)

(*) Notice: Subject to any disclaimer, the term of this patent is extended or adjusted under 35 U.S.C. 154(b) by 228 days.

(21) Appl. No.: 11/136,248

(22) Filed: May 24, 2005

(65) Prior Publication Data
US 2005/0217399 A1 Oct. 6, 2005

Related U.S. Application Data

(63) Continuation of application No. PCT/EP2004/000948, filed on Feb. 3, 2004.

(30) Foreign Application Priority Data
Feb. 11, 2003 (DE) ................. 103 05 407

(51) Int. Cl.
F16H 23/00 (2006.01)
(52) U.S. Cl. ...................... 475/164; 297/362
(58) Field of Classification Search .............. 475/162, 475/163, 164; 297/362
See application file for complete search history.

(56) References Cited

U.S. PATENT DOCUMENTS

| | | | |
|---|---|---|---|
| 4,196,931 A * | 4/1980 | Werner | 297/362 |
| 4,786,110 A | 11/1988 | Mahling et al. | |
| 5,096,261 A * | 3/1992 | Baloche | 297/362 |
| 5,104,190 A | 4/1992 | Siegrist | |
| 5,308,294 A | 5/1994 | Wittig et al. | |
| 5,536,217 A | 7/1996 | Droulon et al. | |
| 5,573,345 A | 11/1996 | Voss et al. | |
| 5,586,833 A | 12/1996 | Vossmann et al. | |
| 5,871,414 A | 2/1999 | Voss et al. | |
| 6,715,832 B2 | 4/2004 | Dill | |
| 2003/0102709 A1 | 6/2003 | Christoffel et al. | |

FOREIGN PATENT DOCUMENTS

| | | |
|---|---|---|
| DE | 32 01 309 A1 | 7/1983 |
| DE | 36 24 018 C2 | 2/1988 |
| DE | 40 30 591 A1 | 4/1991 |
| DE | 43 40 696 C1 | 6/1995 |
| DE | 44 11 214 C2 | 10/1995 |
| DE | 195 48 809 C1 | 5/1997 |
| DE | 101 20 854 C1 | 8/2002 |
| DE | 102 06 303 A1 | 8/2003 |
| EP | 0 556 712 A2 | 8/1993 |
| EP | 0 568 776 B1 | 11/1993 |
| EP | 1 334 866 B1 | 8/2003 |
| FR | 1 598 813 | 7/1970 |
| FR | 2 371 252 | 6/1978 |

(Continued)

Primary Examiner—Ha D. Ho
(74) Attorney, Agent, or Firm—Womble Carlyle Sandridge & Rice, PLLC

(57) ABSTRACT

In the case of a geared fitting (11) for a vehicle seat, in particular for an automotive seat, having a first internal geared wheel (13), a pinion (21) which is driven by an eccentric (15) and meshes with the first internal geared wheel (13), and a second internal geared wheel (31) in which the pinion (21) meshes, the eccentric (15) forms part of an axial clamping (15, 41).

20 Claims, 2 Drawing Sheets

FOREIGN PATENT DOCUMENTS

| | | |
|---|---|---|
| FR | 2 752 886 | 3/1998 |
| GB | 1 511 360 | 5/1978 |
| GB | 2 236 245 | 4/1991 |
| WO | WO 02/078998 | 10/2002 |
| WO | WO 2004/071802 | 8/2004 |

* cited by examiner

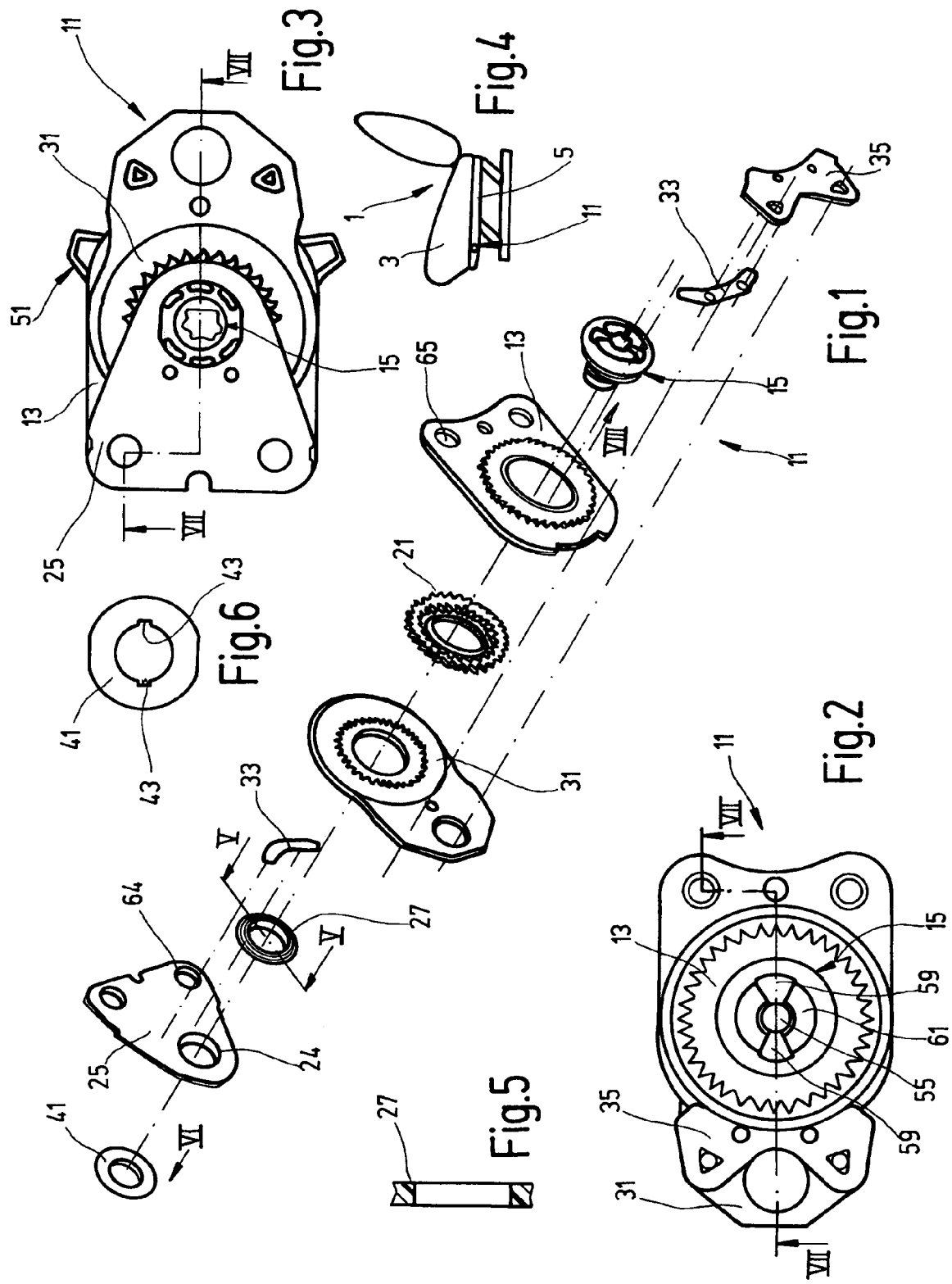

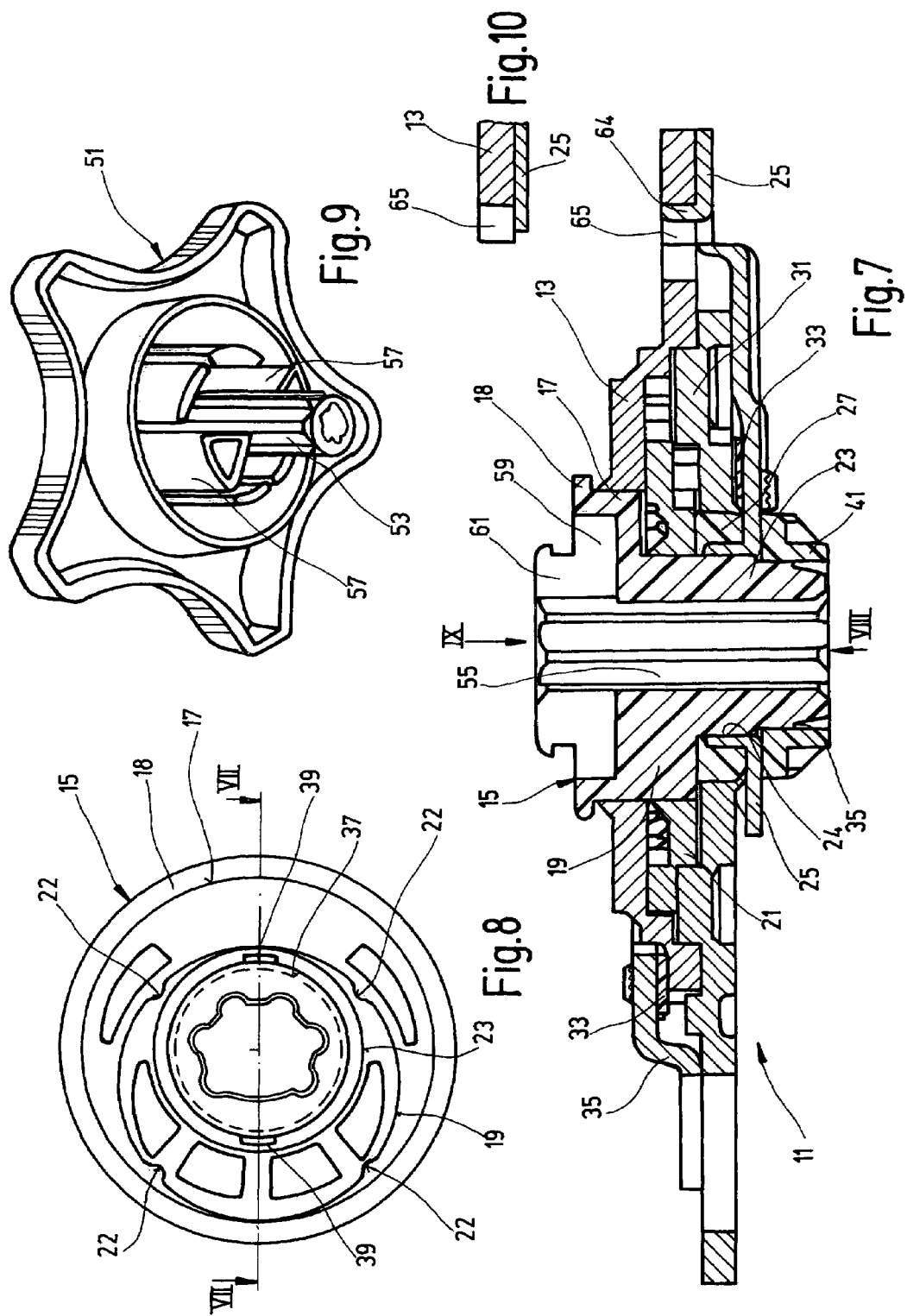

GEARED FITTING FOR A VEHICLE SEAT

CROSS-REFERENCE TO RELATED APPLICATION

The present application is a continuation of International Application PCT/EP2004/000948, which was filed Feb. 3, 2004, and is incorporated herein by reference, in its entirety.

BACKGROUND OF THE INVENTION

The present invention relates to a geared fitting for a vehicle seat, in particular for an automotive seat, having a first internal geared wheel, a pinion which is driven by an eccentric and meshes with the first internal geared wheel, and a second internal geared wheel in which the pinion meshes.

In the case of a geared fitting of the type that is described immediately above and that is known from U.S. Pat. No. 5,536,217, the pinion is driven by a multipart eccentric which is arranged in the interior of the geared fitting and is secured axially by the internal geared wheels. The internal geared wheels are secured axially by means of a ring which clamps the two round internal geared wheels together on their outer circumference. In order to fasten the geared fitting to the seat structure, projections are formed on the internal geared wheels.

BRIEF SUMMARY OF SOME ASPECTS OF THE INVENTION

One aspect of the present invention is the provision of improvements to a geared fitting of a type that is generally described above. In accordance with one aspect of the present invention, a geared fitting for a vehicle seat (e.g., an automotive seat) includes a first internal geared wheel (e.g., a first fitting part having an internal gear), a second internal geared wheel (e.g., a second fitting part having an internal gear), a pinion meshed with the first and second internal geared wheels, and an eccentric. The eccentric can be operative for driving the pinion and thereby causing relative pivoting, about an axis, between the first and second internal geared wheels. The eccentric can also form part of an axial clamping, for at least partially restricting any relative movement, in a direction that extends along the axis, between the first and second internal geared wheels.

Because the eccentric forms part of an axial clamping of the internal geared wheels, in particular for absorbing strong axial forces, with the clamping supplementing the retaining clamps which are typically provided, the forces which occur in the event of a crash can be better absorbed, and so the geared fitting can also be used for applications where there are higher loads. This is also true in comparison with geared fittings which are of simplified construction, are preferably used as backrest adjusters and in which the pinion and an internal geared wheel are replaced by a fitting part of integral design, with the result that basically other force ratios are produced.

The axial clamping is achieved, for example, by the fact that on one side of the geared fitting a ring is fixedly attached to the eccentric, preferably both in a form-fitting and also a frictional manner owing to radial prestressing. For example, the eccentric is inserted from the other side of the geared fitting and is of integral design. The ring then bears against an internal geared wheel or a retaining clamp, whereas on the other side of the geared fitting, the eccentric itself bears, for example by means of a flange integrally formed on it, against the other internal geared wheel or the other retaining clamp. The incorporation of a retaining clamp into the bearing has the advantage that the large forces which can be absorbed owing to the very high axial holding together can also readily be dissipated.

In addition, a means of securing against rotation is preferably provided in the circumferential direction between the eccentric and the ring and prevents noise from being generated. In the case of the solution with the ring, the eccentric can be removed and exchanged even after the geared fitting has been installed, by removing the ring. Refinishing operations in order to reduce play and improve quality are therefore possible. For this purpose, it is advantageous if the eccentric is of axially stepped construction, i.e. its sections which are arranged next to one another in the axial direction have a diameter which becomes smaller (or becomes larger in the other viewing direction). In order to have available during the operation a sufficient quantity of grease which acts in a manner to reduce noise and wear, the eccentric has at least one grease pocket on its circumferential surface.

A spring ring in the geared fitting can prestress the eccentric in the axial direction, for example by being arranged in the axial direction between the ring and the other end of the eccentric, this having a sequence-locking effect. At the same time, play is also reduced in the radial direction. In addition, the spring ring preferably acts as a seal which prevents paint from entering during painting work and prevents grease from emerging during use.

A hand wheel which is provided for driving the eccentric preferably has a shaped transmission rod which interacts in a rotationally fixed manner with the eccentric by means of a form-fitting connection. This integral design reduces the number of components and therefore the complexity of installation. In addition, the productions costs are reduced. An additional means of securing against rotation is preferably provided between the hand wheel and the eccentric and at the same time also permits the transmission of relatively large torques. However, it is also possible to drive the eccentric from the other side of the vehicle seat via a long transmission rod.

In the case of the retaining clamps provided in order to mutually and axially hold the two internal geared wheels together, it is advantageous if, in the case of at least one retaining clamp, collar-type drawn-through portions of the retaining clamp are formed during the installation and are, at the same time, pressed into openings of the internal geared wheel assigned to them. The internal geared wheel and retaining clamp are then connected fixedly to each other, i.e. in particular immovably in relation to each other. Owing to the pressing-in process, the installation of the retaining clamp is free from distortion, with it being possible for the fastening of the geared fitting to subsequently take place through the collar-type drawn-through portions by fastening means being inserted through the collar-type drawn-through portions, or a welding connection being produced in the region of the collar-type drawn-through portions, the fixed connection which is already present preventing any more distortion. An additional securing of the eccentric, which is otherwise mounted in one of the internal geared wheels, by means of a retaining clamp, has the advantage that the system is more reliable in terms of sequence, i.e. small changes in angle due to a torque on the output side are largely avoided.

The geared fitting according to the invention can be used, for example, as an inclination adjuster of a seat cushion of a vehicle seat, where it defines a pivoting movement together with a simple joint. However, it is also conceivable to use the geared fitting according to the invention for other adjustments, for example of the backrest, in which case two geared fittings are then driven via a common transmission rod.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which:

FIG. 1 shows an exploded illustration of the exemplary embodiment,

FIG. 2 shows a side view of the exemplary embodiment,

FIG. 3 shows the side view from the opposite viewing direction in relation to FIG. 2 with the hand wheel mostly concealed, FIG. 4 shows a schematized illustration of a vehicle seat, FIG. 5 shows a radial section through the spring ring along the line V-V in FIG. 1, FIG. 6 shows a view of the inside of the ring in the direction of the arrow VI in FIG. 1, FIG. 7 shows a longitudinal section through the exemplary embodiment along the lines VII-VII in FIGS. 2, 3 and 8, without the hand wheel being illustrated, FIG. 8 shows an end view of the eccentric in the direction of the arrows VIII in FIGS. 1 and 7, FIG. 9 shows a perspective view of the hand wheel which is to be fastened on the eccentric in the direction of the arrow IX in FIG. 7, and FIG. 10 shows a section corresponding to the right-hand part of FIG. 7 before the formation of the second collar-type drawn-through portions.

DETAILED DESCRIPTION OF THE INVENTION

In a vehicle seat 1, a seat cushion 3 is attached on a seat shell and the seat cushion 3 can be adjusted in its inclination relative to the seat frame 5. For this purpose, a crosspiece, which is designed as a tube and forms the front part of the seat frame 5, is coupled pivotably to the front ends of the two side parts of the seat frame 5. Specifically, on one side (in the present case on the tunnel side (e.g., the side of the seat 1 that is adjacent the vehicle's hump that accommodates the drive shaft to the vehicles' rear wheels)), the crosspiece is coupled pivotably to the front end of one of the two side parts of the seat frame 5 by means of a simple pivot joint, in a region in which a compensation spring is also arranged. On the other side (in the present case on the sill side (e.g., the side of the seat 1 that is adjacent the horizontal member that forms the base of the vehicle's door opening), the crosspiece is coupled pivotably to the front end of the other of the two side parts of the seat frame 5 by means of a geared fitting 11. The pivoting movement of the respective portion of the geared fitting 11, and thereby the crosspiece, changes the height of the front edge of the seat cushion 3 and thus the inclination of the seat cushion 3. That is, the geared fitting 11 is used as a drive for causing pivoting movement of the crosspiece, in accordance with the exemplary embodiment of the present invention.

The geared fitting 11 has a first internal geared wheel 13 (e.g., a first fitting part having an internal gear) for fastening to the respective side part of the seat frame 5. Accordingly, the internal geared wheel 13 can be characterized as being on the "frame side" of the geared fitting 11. In accordance with the exemplary embodiment of the present invention, the internal geared wheel 13 (e.g., the frame side of the geared fitting 11) is for being fixedly attached to the respective side part of the seat frame 5. As will become apparent from the following, the "output side" of the geared fitting 11 pivots relative to the frame side of the geared fitting for changing the height of the crosspiece and thus the height of the front edge of the seat cushion 3, and thereby the seat cushion's inclination, in accordance with the exemplary embodiment of the present invention.

In a central opening in the internal geared wheel 13, which is on the frame side of the geared fitting 11, an eccentric 15 made of plastic is mounted rotatably by means of a first bearing section 17. The axis of rotation of the eccentric 15 defines the system of cylindrical coordinates used in the following portion of this Detailed Description section of this disclosure. A flange 18 is integrally formed on the first bearing section 17. The flange 18 bears against the outside of the internal geared wheel 13, which is on the frame side of the geared fitting 11. The first bearing section 17 of the integrally designed eccentric 15 is adjoined in the axial direction, on the side facing away from the flange 18, by a second bearing section 19. The second bearing section 19 is arranged eccentrically with respect to the axis of rotation of the eccentric 15. A pinion 21 sits on the second bearing section 19 in a sliding manner.

Four slightly recessed grease pockets 22 are formed, offset by 90° in each case, on the circumferential surface of the second bearing section 19. The pockets 22 accommodate grease that is provided for improving the sliding of the pinion 21 and for reducing noise.

The internal geared wheel 13, which is on the frame side of the geared fitting 11, includes an internal toothing that is provided in a recessed construction space of the internal geared wheel 13. The pinion 21 includes a first external toothing that meshes with the internal toothing of the internal geared wheel 13. In comparing the first external toothing of the pinion 21 and the internal toothing of the internal geared wheel 13, the number of teeth differs by at least one, and the external diameter of the pinion 21 (i.e. the tip diameter of its toothing) is smaller by at least one tooth height than the internal diameter of the internal geared wheel 13 (i.e. the root diameter of its internal toothing).

The eccentric 15 further includes a third bearing section 23. The third bearing section 23 is arranged at the side of the second bearing section 19 that is opposite from the first bearing section 17. The third bearing section 23 extends in the axial direction and is arranged concentrically with respect to the axis of rotation of the eccentric 15. A first collar-type drawn-through portion 24 of a retaining clamp 25, which is arranged on the outside of the geared fitting 11 and is on the frame side of the geared fitting 11, rotatably supports this third bearing section 23. This further supporting of the eccentric 15 on the frame side of the geared fitting 11 can have the effect that the geared fitting 11 is more reliable in terms of operation. The retaining clamp 25, which is on the frame side of the geared fitting 11, is fastened to the internal geared wheel 13, which is also on the frame side of the geared fitting 11, in a manner described more precisely below. A spring ring 27 of rubber, or of another elastic material, is arranged between a second internal geared wheel 31 and that side of the collar-type drawn-through portion of the retaining clamp 25 which faces radially away from the third bearing section 23. The second internal geared wheel 31 is mounted in the internal geared wheel 13 at a position that is radially outward of the spring ring 27. The second internal geared wheel 31 can be characterized as being on the "output side" of the geared fitting 11 because the second internal geared wheel 31 pivots relative to the first internal geared wheel 13, which is on the frame side of the geared fitting 11. In this case, a slider 33 made of plastic is fastened to the retaining clamp 25 and positioned between the retaining clamp 25, which is on the frame side of the geared fitting 11, and the internal geared wheel 31, which is on the output side of the geared fitting 11.

The pinion 21 includes a second external toothing that is offset axially with respect to the pinion's first external toothing. The pinion 21 meshes by means of its second external toothing in an internal toothing of the internal geared wheel 31, which is on the output side of the geared fitting 11. The internal toothing of the internal geared wheel 31 is provided in a recessed construction space. In a comparison of the second external toothing of the pinion 21 to the internal toothing of the internal geared wheel 31, the number of teeth differs by at least one. The differences in the diameters correspond to those in relation to the internal geared wheel 13, but the diameters are much smaller, so the pinion 21 carries out a stepping-up of the rotational movement. The two internal geared wheels 13 and 31 completely extend around the pinion 21 and bear in a planar manner against each other in the region arranged radially outwardly of the pinion 21. A further slider 33 made of plastic is fastened to a retaining clamp 35 on the output side of the geared fitting 11. The retaining clamp 35 is welded to the internal geared wheel 31, which is on the output side of the geared fitting 11. The slider 33 that is fastened to the retaining clamp 35 bears against that side of the internal geared wheel 13 which faces away from the internal geared wheel 31.

At that end of the eccentric 15 which faces away from the flange 18, a ring holder 37 adjoins the third bearing section 23 in the axial direction. The ring holder 37 is designed in the manner of an annular groove which encircles in the circumferential direction and has two diametrically opposite cams 39 for securing against rotation. A plastic ring 41 is clipped onto this end of the eccentric 15 and, on its inner side, reaches in a form-fitting manner into the ring holder 37. The ring 41 has two holders 43 for securing against rotation. The holders 43 interact in a form-fitting manner with the cams 39 for securing against rotation.

The eccentric 15 together with the ring 41 clipped on it forms an axial clamping which can reliably absorb the severe forces which, in the event of a crash, in addition to the forces in the circumferential direction of the geared fitting also occur in the transverse direction of the seat frame 5, i.e. in the axial direction of the geared fitting 1, for example forces of up to a few kN. The ring 41 is slightly smaller than the ring holder 37 and is therefore clipped on by means of a tool, with the result that it sits on the eccentric 15 not only in a form-fitting manner but also under radial prestressing—and, on account of the spring ring 27, also under axial prestressing.

The means of securing against rotation in the circumferential direction of the geared fitting 11, which means is formed by the cams 39 for securing against rotation and the holders 43 for securing against rotation, prevents formation of noise on account of a relative rotation of the eccentric 15 and ring 41.

Even after being clipped on by means of a tool, for example a screwdriver, the ring 41 may be removed again, thus also enabling the eccentric 15 to be exchanged retrospectively, for example for refinishing operations or in order to reduce the play in the geared fitting 11 by selective fitting.

After installation of the ring 41, the deformed spring ring 27 fills the entire space between the retaining clamp 25, which is on the frame side of the geared fitting 11, the internal geared wheel 31, which is on the output side of the geared fitting 11, the pinion 21 and the eccentric 15. The spring ring 27 applies axial prestressing to the eccentric 15 and thereby prevents the geared fitting 11 from unintentionally operating. In addition, it prevents the grease provided for the movement of the pinion 21 from emerging and prevents paint from entering during painting work.

In order to drive the geared fitting 11, i.e. the eccentric 15, a hand wheel 51 is originally integrally formed with a transmission rod 53 which is profiled by means of longitudinal ribs. The hand wheel 51 is fitted to that end of the eccentric 15 which faces away from the ring 41. The transmission rod 53 reaches in a form-fitting manner into a similarly profiled rod holder 55 which passes centrally through the eccentric 15 in the axial direction. For unambiguous installation, the profiles of the transmission rod 53 and of the rod holder 55 have an irregularity in the form of a missing longitudinal rib or a missing holder for a longitudinal rib at one point in the circumferential direction.

In order to improve the transmission of torque and as an additional means of securing against relative rotation between the hand wheel 51 and eccentric 15, following the transmission rod 53 in the radial direction, two wings 57 are integrally formed on the hand wheel 51, which wings increase in size from the transmission rod 53 in the radial direction in the manner of a butterfly and run in the axial direction parallel to the transmission rod 53. After the installation of the hand wheel 51, the wings 57 reach in a form-fitting manner into corresponding wing holders 59 of the eccentric 15. In order to axially secure the hand wheel 51, the latter is clipped into an undercut defined by a projection 61 of the eccentric 15.

In order to fasten the retaining clamp 25, which is on the frame side of the geared fitting 11, to the internal geared wheel 13, which is on the frame side of the geared fitting 11, there are formed, during the installation, on the retaining clamp 25, radially at a distance from the first collar-type drawn-through portion 24, two further collar-type drawn-through portions which in the present case are referred to as second collar-type drawn-through portions 64. The two second collar-type drawn-through portions 64 are pressed during their formation into respective installation openings 65 in the internal geared wheel 13 (press fit). In contrast, for example, to welding, this joining process is free from distortion, which is advantageous in the case of this last step for fixing the components of the geared fitting 11. The finished geared fitting 11 is screwed, riveted or fastened in some other way to the side part of the seat frame 5, with the corresponding fastening means being inserted through the second collar-type drawn-through portions 64.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A geared fitting for a vehicle seat, the geared fitting comprising:
   a first fitting part having an internal gear,
   a second fitting part having an internal gear,
   a pinion meshed with both the internal gear of the first fitting part and the internal gear of the second fitting part, an eccentric operative for
- (a) driving the pinion and thereby causing relative pivoting, about an axis, between the first fitting part and the second fitting part, and
- (b) at least partially restricting any relative movement, in a direction that extends along the axis, between the first fitting part and the second fitting part, and retaining clamps for at least partially restricting any relative movement, in the direction that extends along the axis, between the first fitting part and the second fitting part, wherein for at least one of the retaining clamps and at least one fitting part selected from the group consisting of the first fitting part and the second fitting part, the retaining clamp is connected to the fitting part by at least one collar-type drawn-through portion of the retaining clamp that is press-fit into an opening of the fitting part.

2. The geared fitting as claimed in claim 1, further comprising a ring that is located on one side of the geared fitting and is fixedly attached to the eccentric.

3. The geared fitting as claimed in claim 2, further comprising means for securing against relative rotation between the eccentric and the ring, wherein the means for securing is provided in the circumferential direction between the eccentric and the ring.

4. The geared fitting as claimed in claim 2, wherein the eccentric is operative, at least after installation of the geared fitting, for being exchanged after the ring has been removed.

5. The geared fitting as claimed in claim 1, further comprising a spring ring for axially prestressing the eccentric.

6. The geared fitting as claimed in claim 1, wherein the eccentric has a circumferential surface that has at least one grease pocket.

7. The geared fitting as claimed in claim 1, further comprising a hand wheel with an integrally formed transmission rod mounted for driving the eccentric, wherein the transmission rod is rotationally fixed to the eccentric by way of a form-fitting connection.

8. The geared fitting as claimed in claim 7, further comprising additional means for restricting any relative rotation between the hand wheel and the eccentric, and the additional means is provided between the hand wheel and the eccentric.

9. The geared fitting as claimed in claim 1 in combination with the vehicle seat, wherein the vehicle seat includes a seat cushion, and the geared fitting is operative for adjusting an inclination of the vehicle seat.

10. The geared fitting as claimed in claim 1, wherein for the at least one of the retaining clamps and the at least one fitting part selected from the group consisting of the first fitting part and the second fitting part:
- the collar-type drawn-through portion of the retaining clamp is a first collar-type drawn-through portion of the retaining clamp,
- the opening of the fitting part is a first opening of the fitting part, and
- the retaining clamp is further connected to the fitting part by a second collar-type drawn-through portion of the retaining clamp that is press-fit into a second opening of the fitting part.

11. The geared fitting as claimed in claim 1, wherein:
- the pinion is meshed with the internal gear of the first fitting part by way of the pinion including a first external toothing that is meshed with the internal gear of the first fitting part,
- the pinion is meshed with the internal gear of the second fitting part by way of the pinion including a second external toothing that is meshed with the internal gear of the second first fitting part, and
- the second external toothing of the pinion is offset axially with respect to the first external toothing of the pinion.

12. A geared fitting for a vehicle seat, the geared fitting comprising:
- a first fitting part having an internal gear;
- a second fitting part having an internal gear;
- a pinion meshed with both the internal gear of the first fitting part and the internal gear of the second fitting part;
- an eccentric operative for
  - (a) driving the pinion and thereby causing relative pivoting, about an axis, between the first fitting part and the second fitting part, and
  - (b) at least partially restricting any relative movement, in a direction that extends along the axis, between the first fitting part and the second fitting part;
- a retaining clamp connected to the first fitting part and at least partially bearing the eccentric; and
- a ring fixedly attached to the eccentric and bearing against the retaining clamp's outer side,
- wherein the eccentric includes a flange bearing against the first fitting part's outer side,
- whereby at least the eccentric and the ring are cooperative for at least partially restricting any relative movement, in the direction that extends along the axis, between the first fitting part and the second fitting part.

13. The geared fitting as claimed in claim 12 in combination with the vehicle seat, wherein the vehicle seat includes a seat cushion, and the geared fitting is operative for adjusting an inclination of the vehicle seat.

14. A vehicle seat, comprising:
a structural part; and
a geared fitting comprising
- (a) a first fitting part having an internal gear,
- (b) a second fitting part having an internal gear,
- (c) a pinion meshed with both the internal gear of the first fitting part and the internal gear of the second fitting part,
- (d) an eccentric operative for
  - (1) driving the pinion and thereby causing relative pvioting, about an axis, between the first fitting part and the second fitting part, and
  - (2) at least partially restricting any relative movement, in a direction that extends along the axis, between the first fitting part and the second fitting part, and
- (e) at least one retaining claim for at least partially restricting any relative movement, in the direction that extends along the axis, between the first fitting part and the second fitting part,
wherein for at least one fitting part selected from the group consisting of the first fitting part and the second fitting part, the retaining clamp is connected to the fitting part by at least one collar-type drawn-through portion of the retaining clamp that is press-fit into an opening of the fitting part, and
wherein the geared fitting is fastened to the structural part of the vehicle seat through the collar-type drawn-through portion of the retaining clamp.

15. The vehicle seat as claimed in claim 14, wherein the collar-type drawn-through portion and the press-fit are formed simultaneously.

16. A geared fitting for a vehicle seat, the geared fitting comprising:
- a first fitting part having an internal gear;
- a second fitting part having an internal gear;
- a pinion meshed with both the internal gear of the first fitting part and the internal gear of the second fitting part;
- an eccentric operative for driving the pinion and thereby causing relative pivoting, about an axis, between the first fitting part and the second fitting part;
- a retaining clamp connected to the first fitting part and at least partially bearing the eccentric; and
- a ring fixedly attached to the eccentric and bearing against the retaining clamp's outer side;
- wherein the eccentric includes a flange bearing against the first fitting part's outer side,
- whereby at least the eccentric and the ring are cooperative for at least partially restricting any relative movement, in the direction that extends along the axis, between the first fitting part and the second fitting part.

17. The geared fitting as claimed in claim 16, wherein the eccentric has a circumferential surface that has at least one grease pocket.

18. The geared fitting as claimed in claim 16 in combination with the vehicle seat, wherein:
- for at least one fitting part selected from the group consisting of the first fitting part and the second fitting part, the retaining clamp is connected to the fitting part by at last one collar-type drawn-through portion of the retaining clamp that is press-fit into an opening of the fitting part, and
- the geared fitting is fastened to a structural part of the vehicle seat proximate the collar-type drawn-through portion of the retaining clamp.

19. The geared fitting as claimed in claim 16, further comprising means for securing against relative rotation between the eccentric and the ring, wherein the means for securing is provided in the circumferential direction between the eccentric and the ring.

20. The geared fitting as claimed in claim 16, further comprising a spring ring for axially prestressing the eccentric.

* * * * *